(12) United States Patent
Berchtold et al.

(10) Patent No.: US 10,143,049 B2
(45) Date of Patent: Nov. 27, 2018

(54) ELECTRONIC OPERATING DEVICE FOR LIGHT SOURCES

(71) Applicant: OSRAM GmbH, Munich (DE)

(72) Inventors: Ralf Berchtold, Munich (DE); Maximilian Schmidl, Pullach (DE)

(73) Assignee: OSRAM GMBH, Munich (DE)

(*) Notice: Subject to any disclaimer, the term of this patent is extended or adjusted under 35 U.S.C. 154(b) by 0 days.

(21) Appl. No.: 15/787,725

(22) Filed: Oct. 19, 2017

(65) Prior Publication Data

US 2018/0116018 A1    Apr. 26, 2018

(30) Foreign Application Priority Data

Oct. 21, 2016 (DE) .................. 10 2016 220 718

(51) Int. Cl.
*H05B 37/02* (2006.01)
*H05B 33/08* (2006.01)

(52) U.S. Cl.
CPC ....... *H05B 33/0815* (2013.01); *H05B 33/083* (2013.01); *H05B 33/0842* (2013.01); *H05B 33/0884* (2013.01); *H05B 33/0896* (2013.01); *H05B 37/0281* (2013.01)

(58) Field of Classification Search
None
See application file for complete search history.

(56) References Cited

U.S. PATENT DOCUMENTS

| | | | |
|---|---|---|---|
| 7,781,987 B2 | 8/2010 | Cheng et al. | |
| 9,167,658 B2* | 10/2015 | Nakajo | H05B 33/0896 |
| 9,203,253 B2* | 12/2015 | Nomoto | H01M 10/48 |
| 2006/0001382 A1* | 1/2006 | Nomoto | H01M 8/04589 |
| | | | 315/209 R |
| 2009/0237007 A1 | 9/2009 | Leng | |
| 2010/0001657 A1* | 1/2010 | Chen | H05B 33/0815 |
| | | | 315/291 |

OTHER PUBLICATIONS

German Search Report based on application No. 10 2016 220 718.0 (7 pages) dated May 16, 2017.

* cited by examiner

*Primary Examiner* — Vibol Tan
(74) *Attorney, Agent, or Firm* — Viering Jentschura & Partner MBB

(57) ABSTRACT

In various embodiments, an electronic operating device for light sources is provided. The electronic operating device may include an input part for inputting an input voltage and an output part for outputting an output voltage and an output current for the light sources. The electronic operating device is configured to operate the output part as a voltage source for a period of time after the input voltage has been applied, and subsequently to operate the output part as a current source after this period of time.

14 Claims, 7 Drawing Sheets

ELECTRONIC OPERATING DEVICE FOR LIGHT SOURCES

CROSS-REFERENCE TO RELATED APPLICATION

This application claims priority to German Patent Application Serial No. 10 2016 220 718.0, which was filed Oct. 21, 2016, and is incorporated herein by reference in its entirety.

TECHNICAL FIELD

Various embodiments relate generally to an electronic operating device for light sources.

BACKGROUND

In electronic operating devices for light sources, such as light emitting diodes (LEDs), for example, it is important to know the voltage, for example of a connected LED module, as rapidly and precisely as possible, in order to ensure a quiet, fast start without overshoots in the supply voltage of the LED module. In the following text, the start is considered to be the time from applying an input power to the electronic operating device until the operating voltage of a light source connected to the electronic operating device is reached. In this case, the light source may be an LED module, for example.

In the conventional technologies, a control element at the output of the operating device sets the current using the inherent controller constants of the control element, which leads to the light emitted by the LED module reaching its target value more rapidly or slowly with more or fewer overshoots depending on the data of the LED module and the target current (can be, for example, selectable between 100% and 1% in dimmed operation). Typically, it takes the longest at high operating voltages of the LED module and low operating currents (case 1) and the shortest at low operating voltages of the LED module and high operating currents (case 2).

For case 1, depending on the output capacity of the electronic operating device, times of between 900 ms in an OTi 25 offered by OSRAM at 54 V/1.8 mA and 4 seconds in a DALI Cube likewise offered by OSRAM are known. In case 2, the OTi 25 needs approximately 100 ms.

SUMMARY

In various embodiments, an electronic operating device for light sources is provided. The electronic operating device may include an input for inputting an input voltage and an output for outputting an output voltage and an output current for the light sources. The electronic operating device is configured to operate the output as a voltage source for a period of time after the input voltage has been applied, and subsequently to operate the output as a current source after this period of time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
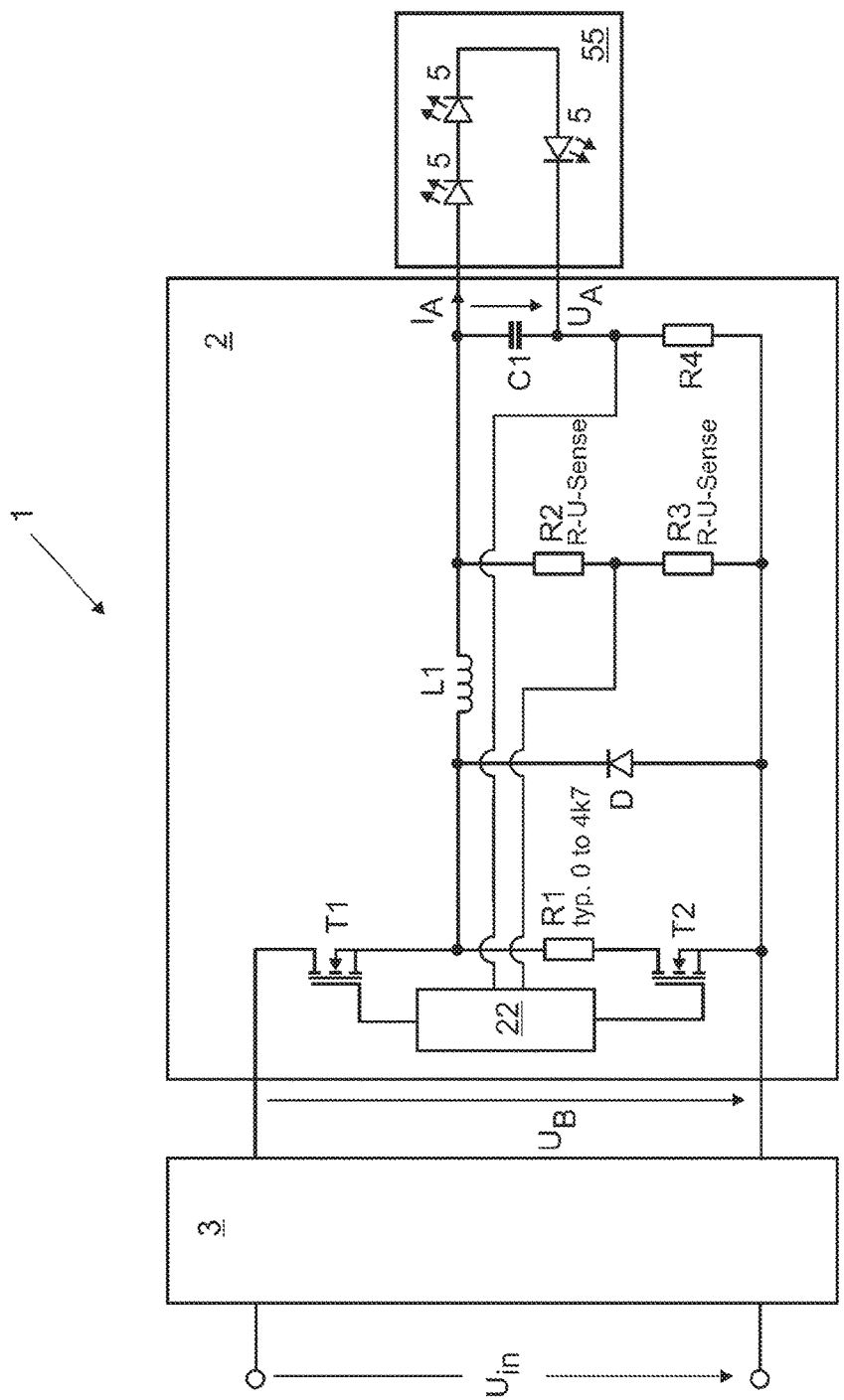
FIG. 1 shows a schematic circuit diagram of the output part of the electronic operating device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments specify an electronic operating device that always requires approximately the same period of time to start.

Various embodiments provide an electronic operating device for light sources, having an input for inputting an input voltage, an output for outputting an output voltage and an output current for the light sources, wherein the electronic operating device is configured to operate the output as a voltage source for a period of time after the input voltage has been applied or to operate the output as a voltage source when the input voltage is applied for a period of time after a light source has been connected and subsequently to operate the output as a current source after this period of time.

Depending on the application, different times can be considered here as the period of time. If overshooting in the output voltage is permitted, the period of time is less than 50 ms; if the voltage is to be increased as accurately as possible to the voltage of the light source, the period of time is less than approximately 100 ms.

In various embodiments, the electronic operating device is configured to measure the output voltage and to identify a point of discontinuity in the time profile of the output voltage. This ensures a particularly rapid and reliable start of the electronic operating device, since it can rapidly be identified whether a load is connected to the electronic operating device or not.

In various embodiments, the electronic operating device is configured to prescribe the output voltage at the point of discontinuity as the setpoint voltage for a control loop, which regulates the output voltage and the output current during operation after the period of time. This measure enables a clean start with minimal overshoots in the voltage or in the current for the connected light sources.

In another embodiment, said electronic operating device is configured, in the period of time after the input voltage has been applied, to deactivate the control loop and to control the output part merely to a predetermined output voltage. A particularly rapid increase in the output voltage can be brought about thereby.

In various embodiments, said electronic operating device is configured to bring about the control by means of current values and voltage values stored in a table. This measure can also be used to generate a rapid increase in the output voltage.

In various embodiments, said electronic operating device is configured, in the period of time after the input voltage has been applied, to set up the control loop in such a way that said control loop regulates the output voltage to a predetermined voltage. This measure ensures particularly precise setting of the output voltage, and thus protects light sources that are very sensitive to voltage.

In various embodiments, the light source is an LED module. Nowadays, LED modules are very commonly used for illumination purposes.

Various embodiments likewise provide a method for controlling an electronic operating device for light sources having an input for inputting an input voltage, an output for outputting an output voltage and an output current. The method may include:
operating the output as a voltage source for a period of time after the input voltage has been applied or operating the output as a voltage source when the input voltage is applied for a period of time after a light source has been connected, and subsequently, and
operating the output as a current source.

Various embodiments are found in the dependent claims and the entire description, wherein a distinction between device and use aspects is not always specifically drawn in the explanation; the disclosure should at any rate be interpreted implicitly with regard to all claim categories.

FIG. 1 shows a schematic circuit diagram of the output part of the electronic operating device in a configuration. The electronic operating device 1 has an input part 3 and an output part 2. A voltage $U_{in}$ that supplies the electronic operating device 1 with a power $P_{in}$ is input into the input part 3. The output part 2 has a half bridge consisting of transistors T1 and T2 connected in series. The half bridge is part of a step-down converter, which furthermore comprises a diode D and an inductor L and a capacitor C1. The output is connected in parallel with the capacitor C1, to which output an LED module 55 having a plurality of LEDs 5, which is not associated with the electronic operating device, is connected. An output voltage $U_A$ is applied to the output and an output current $I_A$ flows. The output part is operated by a control device 22, which drives the transistors and sets up a control loop by measuring the output voltage $U_A$ and the output current $I_A$ and correspondingly driving the transistors.

Various embodiments guarantee rapid identification of the output voltage and thus low variation in the start times of the electronic operating device. The identification of the voltage makes it possible to initialize the regulator (the hardware components concerned together with the control loop) in such a way that the start value of the output current $I_A$ is already very close to the target current, which guarantees rapid switch-on and a low overshoot/undershoot in the output voltage $U_A$. In addition, the initialization achieves additional degrees of freedom in the regulator dimensioning, since the start can be faded out.

In accordance with the invention, the output stage of the driver (in the specific case a step-down converter or buck converter) is operated, during the identification phase, as a voltage output, that is to say a voltage source, under the assumption that there is no load at the output. In various embodiments, the identification phase lasts for approximately 100 ms from the start of the device or from the connection of an LED module 55, respectively. The control device 22 then switches over from operating as a voltage source to operating as a current source. The identified parameters are used for the control loop for operating as a current source.

In a first embodiment, the operation as a voltage source takes place by way of rapid closed-loop control or, in a second embodiment, by way of open-loop control. The parameters of the output loop (L/C, bus voltage $U_B$) are known to a sufficiently precise degree.

In the second embodiment, the upper switch T1 and the lower switch T2 are driven by means of a table in such a way that, without a load at the output, the output voltage increases as rapidly as possible. Here, it is possible to weigh up whether a minimal prescribed output current $I_A$ should not be exceeded at any point if a load with the corresponding voltage were at the output or whether a short overshoot (typically of <1 ms) is permitted. In the second embodiment, the minimal prescribed output current $I_A$ is 1.8 mA at 25 W output power of the electronic operating device. If a short overshoot in the output voltage is permitted, the identification phase can be reduced to below 30 ms.

Figure 2:
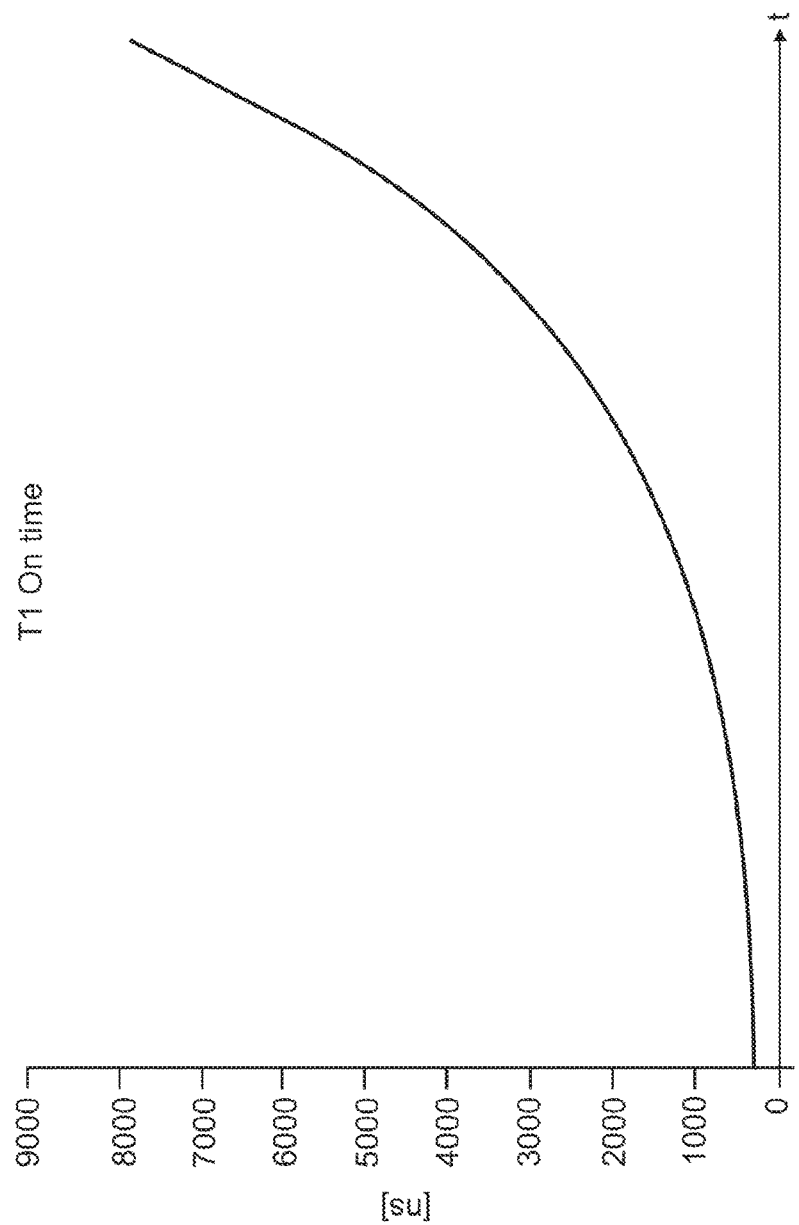
FIG. 2 shows the on time of T1 over the duration of a start process to reach an output voltage $U_A$ as illustrated in FIG. 3.

FIG. 2 shows the duration of the on time of the upper switch T1 over the duration of a start process.

A linearly increasing output voltage $U_A$ can be generated by a duration of the on time of the upper switch T1, which increases following a quadratic function.

The duration of the off time of the upper switch T1 remains the same over the duration of a start process. The duty ratio for the lower switch T2 is likewise not changed during the start attempt.

Figure 3:
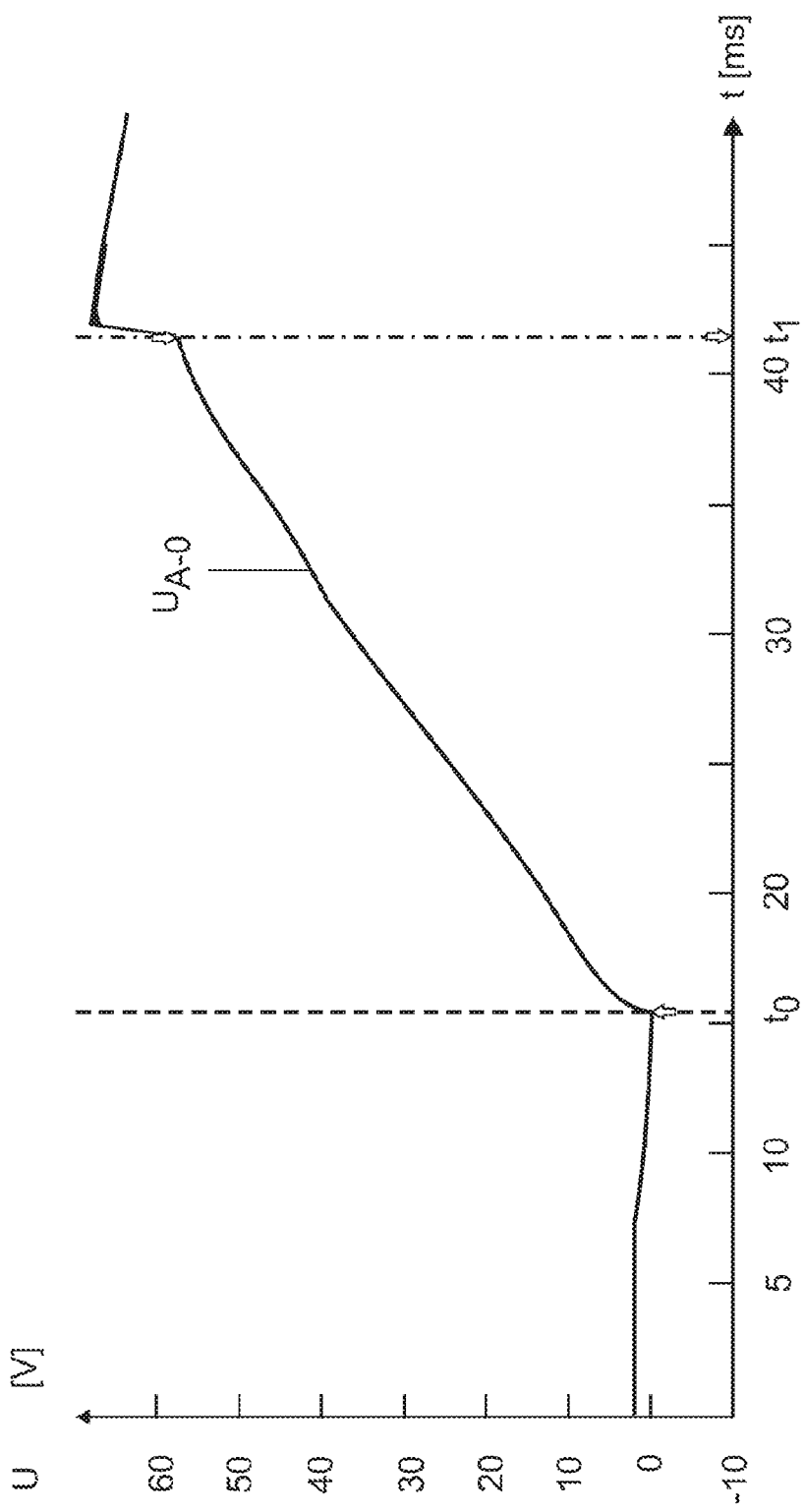
FIG. 3 shows the output voltage $U_A$ of the electronic operating device in the case of a start without a load.

FIG. 3 shows the output voltage $U_A$ of the electronic operating device in the case of a start without a load. The electronic operating device is switched on at the time $t_0$. It can be readily seen from the curve $U_{A-0}$ that, without a load at the output, the output voltage $U_A$ passes through the region 0.58 V linearly up to the time $t_1$ in approximately 30 ms.

Figure 4:
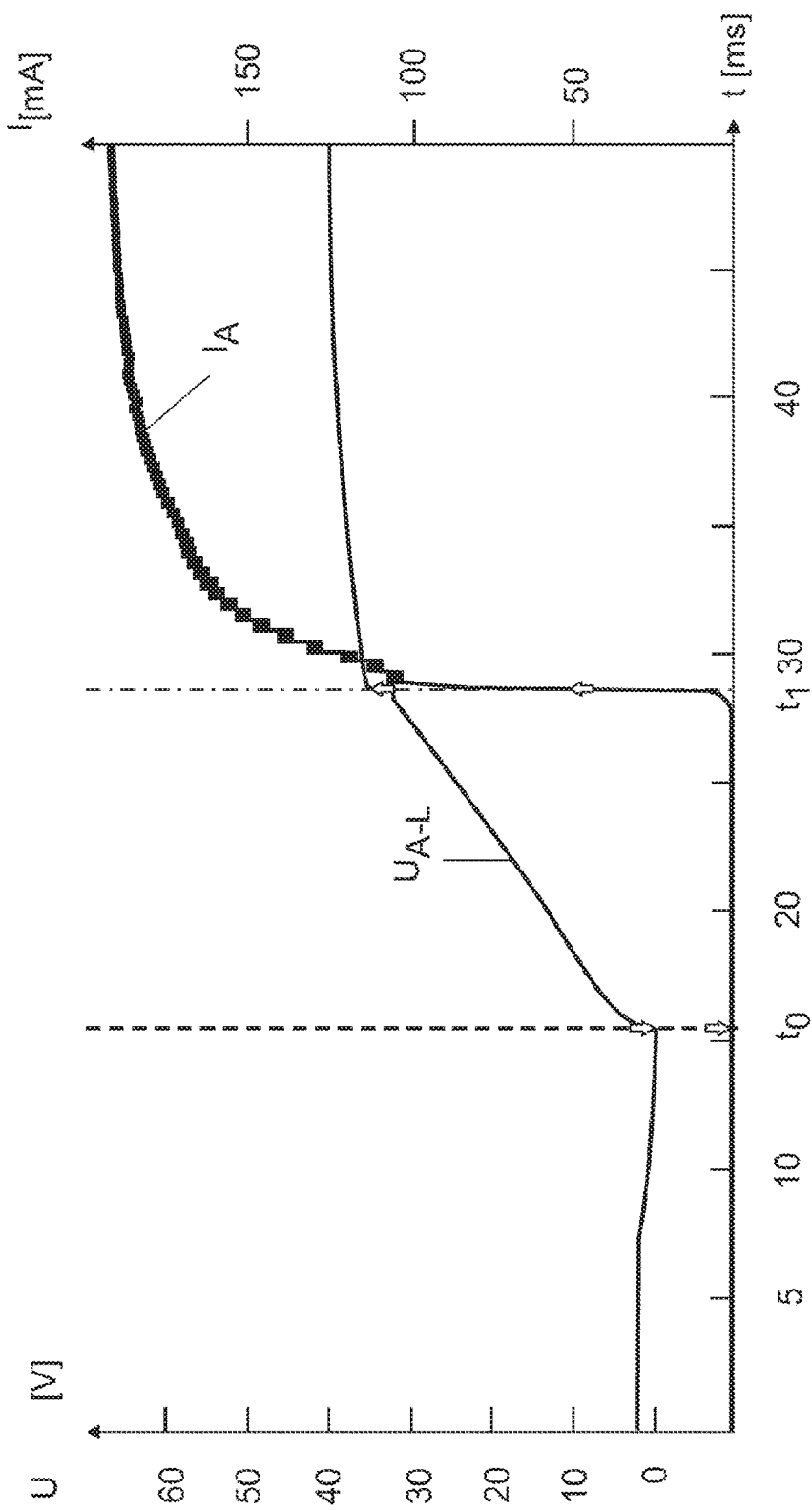
FIG. 4 shows the output voltage $U_A$ of the electronic operating device in the case of a start with a load.

FIG. 4 shows the output voltage $U_A$ of the electronic operating device in the case of a start with a load at the output. The electronic operating device is switched on at the time $t_0$. If a load is present, a kink, that is to say a point of discontinuity in the voltage curve, in the output voltage $U_A$ is created, said kink being detected by the electronic operating device 1 before the current increases above the minimum current. This kink at the time $t_1$ can be readily seen in the curve $U_{A-L}$. After the time $t_1$, the current $I_A$ increases rapidly until it levels out at the rated current.

The kink or the point of discontinuity in the voltage curve is identified as follows: assuming there is no load at the output, the control device 22 of the electronic operating device expects a virtually linear increase in the output voltage $U_A$ until the maximum of the permitted operating range is reached. If there is then a load at the output, this leads to the output voltage $U_A$ increasing more slowly than expected. While the identification operation is running, the control device 22 of the electronic operating device monitors the increase in the operating voltage $U_A$. This is easiest to bring about using the 1st derivative of the output voltage $U_A$. As soon as the supply voltage required for the operation of a connected LED is reached, this slows the increase in the output voltage $U_A$. The LED effectively clamps the output voltage $U_A$. The 1st derivative of the output voltage $U_A$ thus changes significantly, which is identified by the control device of the electronic operating device as a point of discontinuity in the time profile of the output voltage.

This output voltage $U_A$ in the kink is now prescribed as the setpoint value for the control loop, which, in the time after the period of time $t_1$, regulates the output current $I_A$ for the LED module 55.

Figure 5:
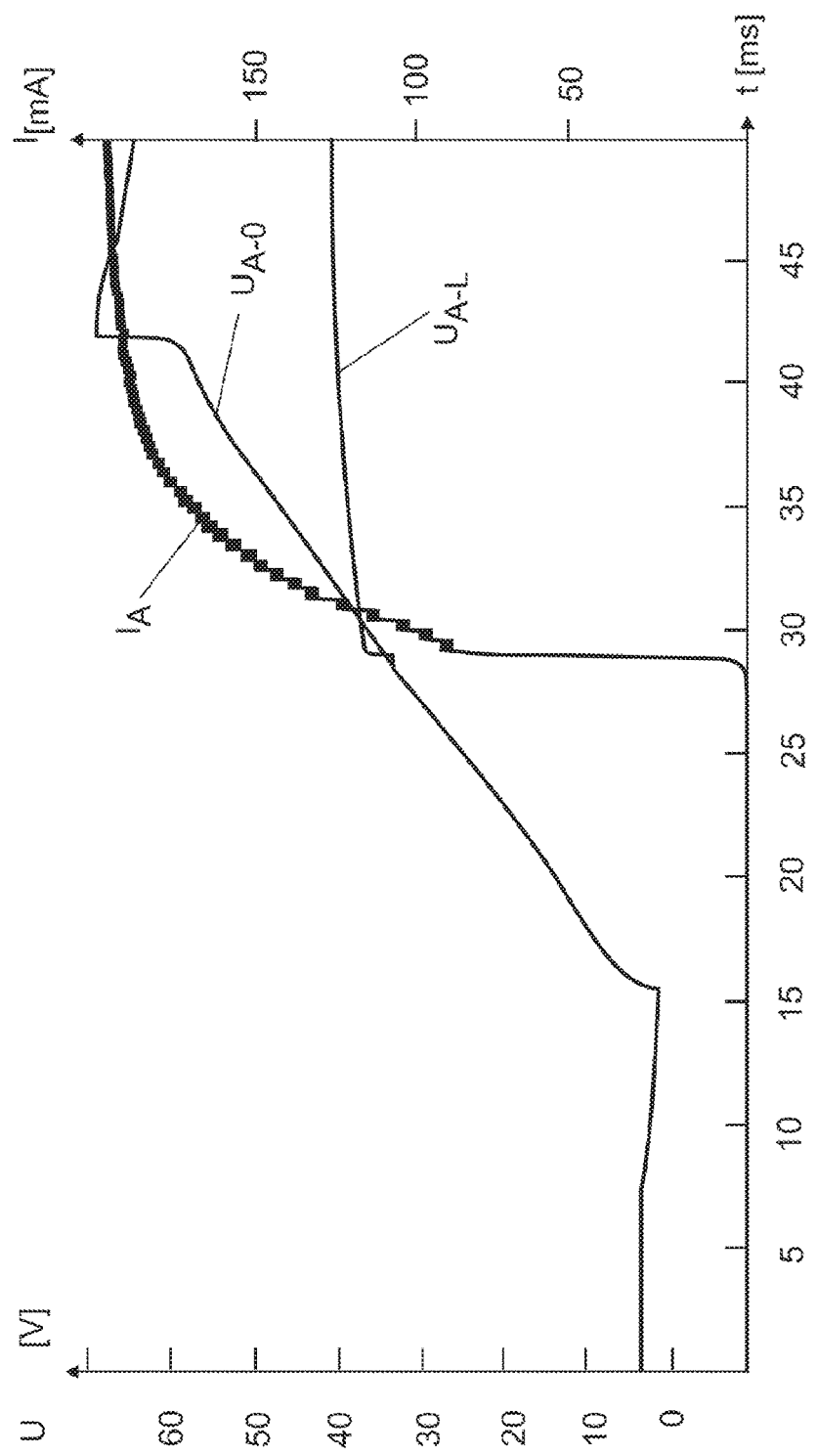
FIG. 5 shows the output voltage $U_A$ and the output current $I_A$ of the electronic operating device comparing with and without load.

FIG. 5 again shows the output voltage $U_A$ of the electronic operating device comparing with and without load. The curve $U_{A-0}$ shows the output voltage $U_A$ without a load, the curve $U_{A-L}$ shows the output voltage $U_A$ with a load. The curve of the output current $I_A$ is likewise indicated.

In the second embodiment, a linearly increasing output voltage $U_A$ at the output was sought. Since the main focus was on rapid load identification, the method with open-loop control of the output voltage and a thus very short run-up of this voltage was selected. In this case, it was deliberately accepted that the output voltage contains a short overshoot. The kink, that is to say the point of discontinuity in the voltage curve, is detected, given a start with a load, by the electronic operating device as already described above by means of measuring the output voltage $U_A$. The regulator is initialized using said measured voltage and can then asymptotically reach the target current very rapidly.

Figure 6:
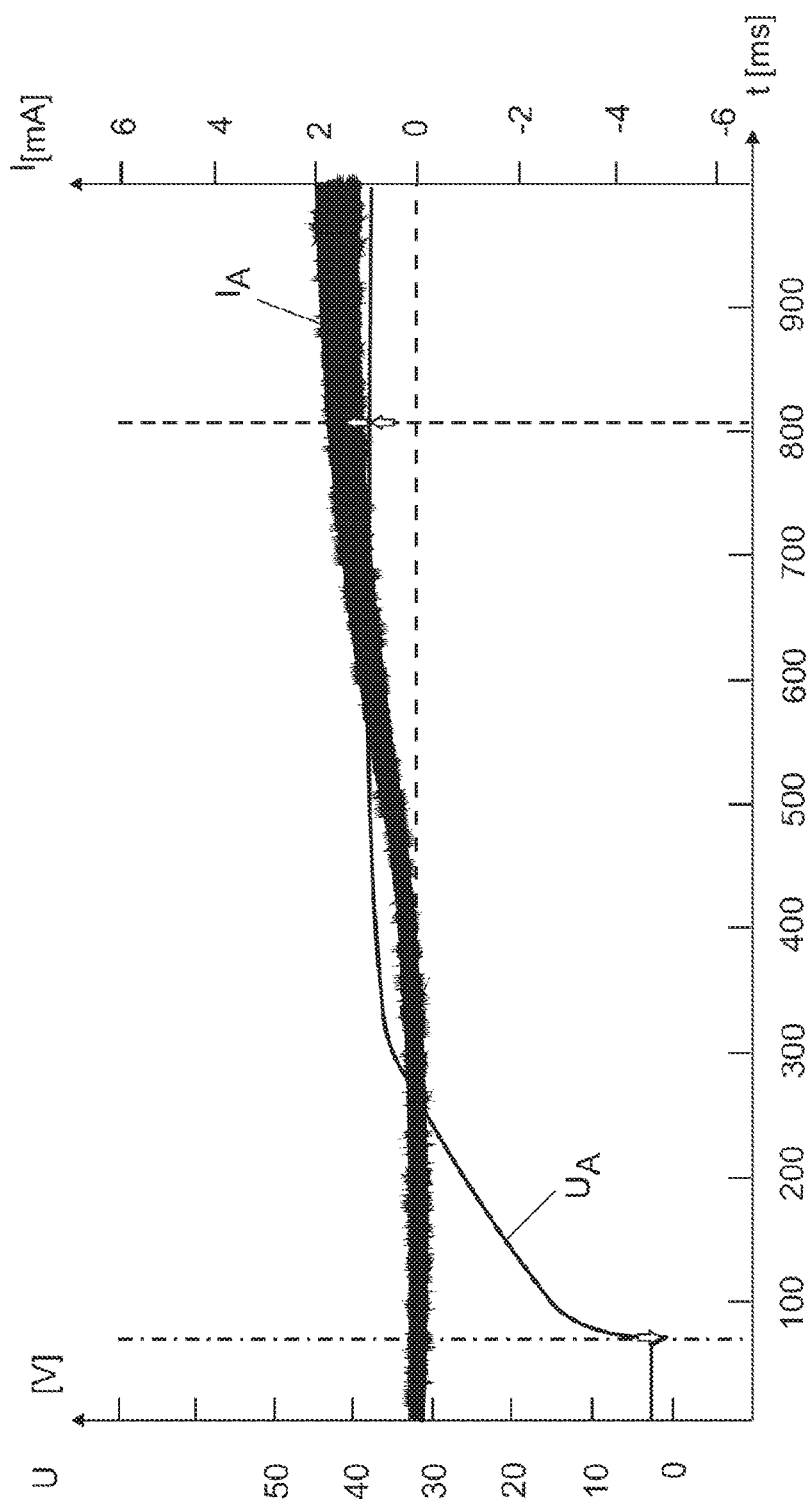
FIG. 6 shows the output voltage $U_A$ and the output current $I_A$ of an electronic operating device in accordance with a conventional technology.
Figure 7:
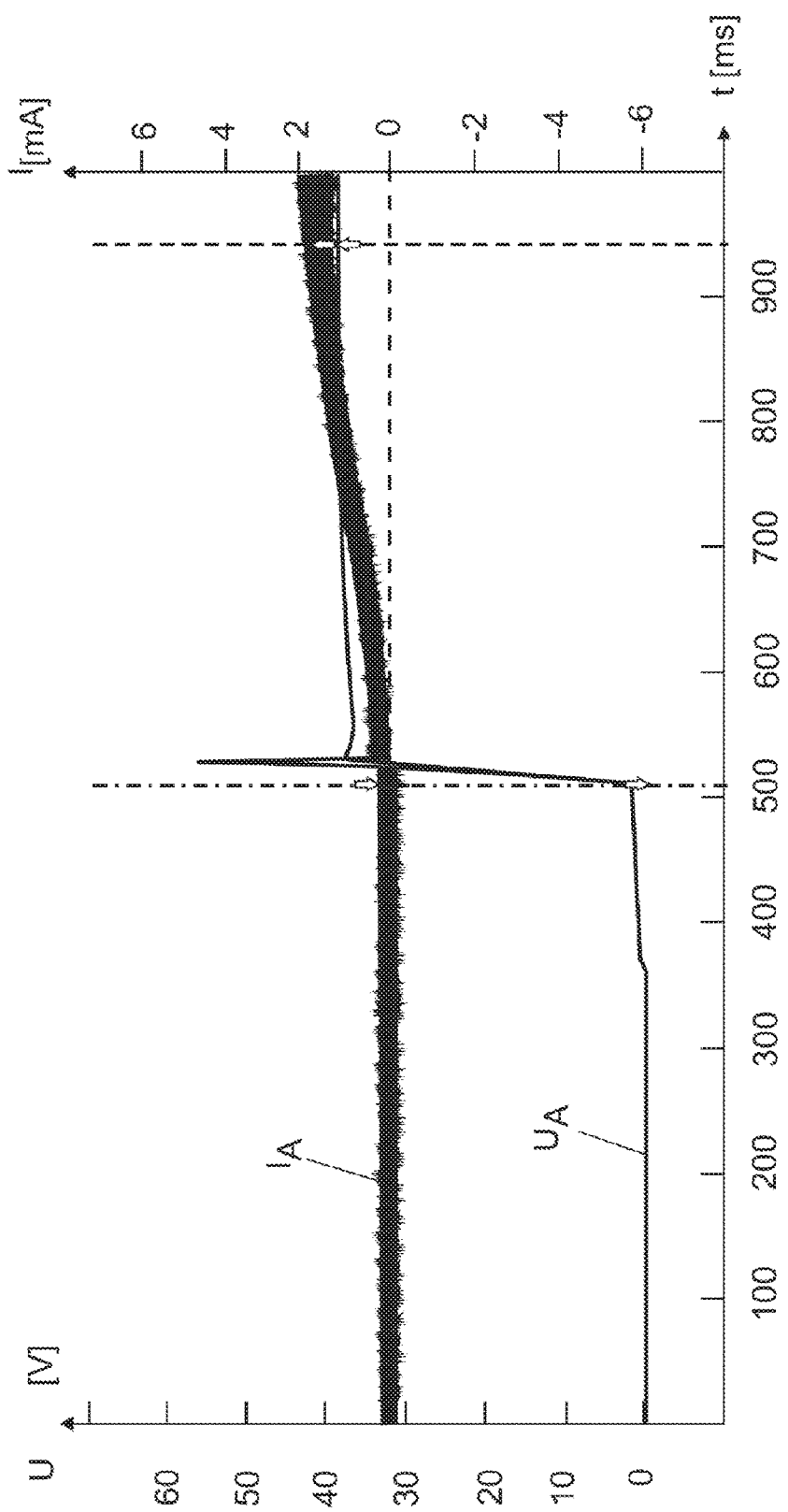
FIG. 7 shows the output voltage $U_A$ and the output current $I_A$ of the electronic operating device in accordance with the second embodiment.

In comparison, FIG. 6 and FIG. 7 show the output voltage $U_A$ and the output current $I_A$ of an electronic operating device in accordance with the prior art and the output voltage $U_A$ and the output current $I_A$ of the electronic operating device in accordance with the second embodiment.

With a conventional electronic operating device having a PI regulator, it takes approximately 200 ms after the start for a significant current to flow and for the LED to begin to emit light. 90% of the rated current of the output current $I_A$ is only reached after more than 700 ms, as can be easily gathered from FIG. 6.

With the electronic operating device in the second embodiment with the method of rapid load identification, the rated value of the output voltage $U_A$ is already reached after less than 30 ms and 90% of the rated current of the output current $I_A$ is already reached after 430 ms, as can be gathered from FIG. 7. In this figure, the short overshoot of less than 1 ms can also be seen. On account of the short length of the overshoot, it is not negatively perceivable to the human eye as a flash of light.

LIST OF REFERENCE SIGNS

1 Electronic operating device
2 Output part
3 Input part
$U_{in}$ Input voltage
$U_A$ Output voltage
$U_B$ Bus voltage between input part 3 and output part 2
$I_A$ Output current
5 LED
55 LED module
22 Control device While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic operating device for light sources, comprising:
    an input part for inputting an input voltage;
    an output part for outputting an output voltage and an output current for the light sources;
    wherein the electronic operating device is configured
        to operate the output part as a voltage source for a period of time after the input voltage has been applied;
        subsequently to operate the output part as a current source after this period of time;
        to measure the output voltage and to identify a point of discontinuity in a time profile of the output voltage; and
        to prescribe the output voltage at the point of discontinuity as a setpoint voltage for a control loop, which regulates the output voltage and the output current during operation after the period of time.

2. The electronic operating device of claim 1, further configured, in the period of time after the input voltage has been applied, to deactivate the control loop and to control the output part merely to a predetermined output voltage.

3. The electronic operating device of claim 2, further configured to bring about the control by means of current values and voltage values stored in a table.

4. The electronic operating device of claim 1, further configured, in the period of time after the input voltage has been applied, to set up the control loop in such a way that said control loop regulates the output voltage to a predetermined voltage.

5. The electronic operating device of claim 1, wherein the light source is a light emitting diode module.

6. An electronic operating device for light sources, comprising:
    an input part for inputting an input voltage;
    an output part for outputting an output voltage and an output current for the light sources;
    wherein the electronic operating device is configured
        to operate the output part as a voltage source when the input voltage is applied for a period of time after a light source has been connected; and
        subsequently to operate the output part as a current source after this period of time;
        to measure the output voltage and to identify a point of discontinuity in a time profile of the output voltage; and
        to prescribe the output voltage at the point of discontinuity as a setpoint voltage for a control loop, which regulates the output voltage and the output current during operation after the period of time.

7. The electronic operating device of claim 6, further configured, in the period of time after the input voltage has been applied, to deactivate the control loop and to control the output part merely to a predetermined output voltage.

8. The electronic operating device of claim 7, further configured to bring about the control by means of current values and voltage values stored in a table.

9. The electronic operating device of claim 6, further configured, in the period of time after the input voltage has been applied, to set up the control loop in such a way that said control loop regulates the output voltage to a predetermined voltage.

10. The electronic operating device of claim 6, wherein the light source is a light emitting diode module.

11. A method for controlling an electronic operating device for light sources,
the electronic operating device comprising:
an input for inputting an input voltage;
an output for outputting an output voltage and an output current;
the method comprising:
operating the output as a voltage source for a period of time after the input voltage has been applied or operating the output as a voltage source when the input voltage is applied for a period of time after a light source has been connected, and subsequently operating the output as a current source;
measuring the output voltage and identifying a point of discontinuity in a time profile of the output voltage; and
prescribing the output voltage at the point of discontinuity as a setpoint voltage for a control loop, which regulates the output voltage and the output current during operation after the period of time.

12. The electronic operating device of claim 1, further configured to identify the point of discontinuity before the output current increases above a minimum current.

13. The electronic operating device of claim 6, further configured to identify the point of discontinuity before the output current increases above a minimum current.

14. The method for controlling the electronic operating device of claim 11,
further comprising identifying the point of discontinuity before the output current increases above a minimum current.

* * * * *